(12) United States Patent
Mineo

(10) Patent No.: US 12,187,261 B2
(45) Date of Patent: Jan. 7, 2025

(54) CONTROL DEVICE FOR HYBRID VEHICLE

(71) Applicant: TOYOTA JIDOSHA KABUSHIKI KAISHA, Toyota (JP)

(72) Inventor: Kentaro Mineo, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/431,362

(22) Filed: Feb. 2, 2024

(65) Prior Publication Data

US 2024/0262337 A1  Aug. 8, 2024

(30) Foreign Application Priority Data

Feb. 6, 2023 (JP) .................... 2023-016286

(51) Int. Cl.
*B60W 20/00* (2016.01)
*B60W 10/08* (2006.01)
*F02D 41/02* (2006.01)
*B60W 10/06* (2006.01)

(52) U.S. Cl.
CPC .......... *B60W 10/08* (2013.01); *F02D 41/029* (2013.01); *B60W 10/06* (2013.01); *B60W 20/00* (2013.01)

(58) Field of Classification Search
CPC ...... B60W 10/08; B60W 10/06; B60W 20/00; F02D 41/029; F02D 41/22; F02D 41/222; F02D 41/1495; F02D 2200/0802
See application file for complete search history.

(56) References Cited

U.S. PATENT DOCUMENTS 8,234,030 B2 * 7/2012 Sugimoto .............. F02M 26/49
701/22
8,904,754 B2 * 12/2014 Sasaki .................... F01N 3/10
60/274
11,898,477 B2 * 2/2024 Yaeo ................... F02D 41/0235

FOREIGN PATENT DOCUMENTS

JP         2021-127004 A      9/2021
JP        2022182731 A   * 12/2022

* cited by examiner

*Primary Examiner* — Sherry L Estremsky
(74) *Attorney, Agent, or Firm* — Finnegan, Henderson, Farabow, Garrett and Dunner LLP

(57) ABSTRACT

In a control device for a hybrid vehicle including a motor and an internal combustion engine as power sources, the control device includes a diagnosis unit configured to diagnose a component of the hybrid vehicle during fuel cut of the internal combustion engine, an estimation unit configured to estimate a time required for diagnosis by the diagnosis unit, an upper limit setting unit configured to set an upper limit of a time during which the fuel cut is executed, and a motor control unit configured to control the motor.

4 Claims, 6 Drawing Sheets

CONTROL DEVICE FOR HYBRID VEHICLE

CROSS-REFERENCE TO RELATED APPLICATION

This application is based upon and claims the benefit of priority of the prior Japanese Patent Application No. 2023-016286, filed on Feb. 6, 2023, the entire contents of which are incorporated herein by reference.

TECHNICAL FIELD

The present disclosure relates to a control device for a hybrid vehicle.

BACKGROUND

In a hybrid vehicle, for example, an air-fuel ratio sensor may be self-diagnosed during fuel cut (see, for example, Japanese Unexamined Patent Application Publication No. 2021-127004).

During the fuel cut, the motor outputs driving force (motor assist). When the self-diagnosis is not completed, the fuel cut is repeated and the motor assist is also repeated. The frequency of the motor assist increases, and power consumption increases.

SUMMARY

It is therefore an object of the present disclosure to provide a control device for a hybrid vehicle capable of suppressing an increase in power consumption.

The above object is achieved by a control device for a hybrid vehicle including a motor and an internal combustion engine as power sources, the control device including: a diagnosis unit configured to diagnose a component of the hybrid vehicle during fuel cut of the internal combustion engine; an estimation unit configured to estimate a time required for diagnosis by the diagnosis unit; an upper limit setting unit configured to set an upper limit of a time during which the fuel cut is executed; and a motor control unit configured to control the motor, wherein when the time estimated by the estimation unit is equal to or less than the upper limit, the motor control unit is configured to permit driving assist by the motor during the fuel cut, and when the time estimated by the estimation unit is greater than the upper limit, the motor control unit is configured to limit the driving assist by the motor during the fuel cut.

A filter may be provided in an exhaust path of the internal combustion engine, and the upper limit setting unit may be configured to set the upper limit based on a deposition amount of particulate matters on the filter and a temperature of the filter.

The control device may further include a first measurement unit configured to measure a number of times that the diagnosis by the diagnosis unit is not completed, wherein when the number of times that the diagnosis by the diagnosis unit is not completed is equal to or greater than a predetermined number of times, and when the time estimated by the estimation unit is greater than the upper limit, the motor control unit may be configured to limit the driving assist by the motor during the fuel cut.

The control device may further include a second measurement unit configured to measure a time elapsed during the fuel cut, wherein when the number of times that the diagnosis by the diagnosis unit is not completed is equal to or greater than the predetermined number of times, and when the time measured by the second measurement unit is less than a predetermined time, the motor control unit may be configured to limit the driving assist by the motor, and when the number of times that the diagnosis by the diagnosis unit is not completed is equal to or greater than the predetermined number of times, and when the time measured by the second measurement unit is equal to or greater than the predetermined time, the motor control unit may be configured to permit the driving assist by the motor during the fuel cut.

DETAILED DESCRIPTION

First Embodiment

Figure 1:
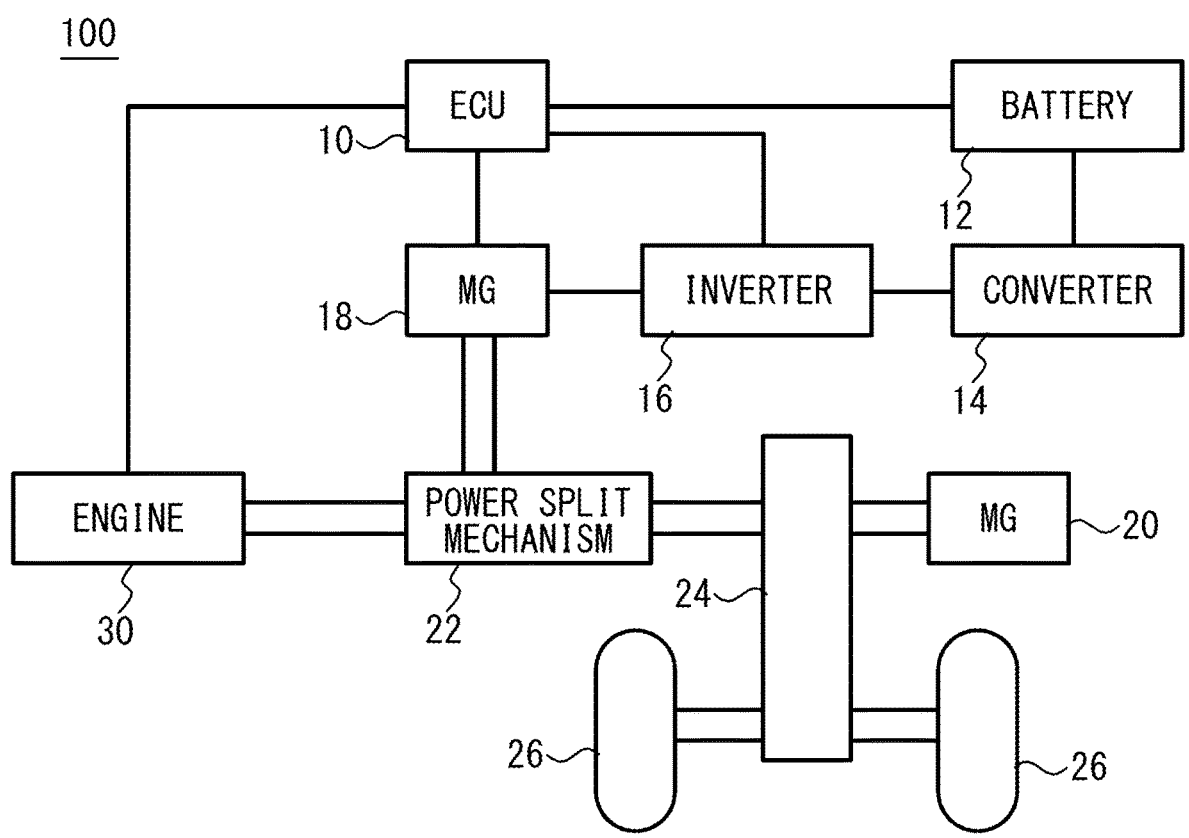
FIG. 1 is a block diagram illustrating a hybrid vehicle.

FIG. 1 is a block diagram illustrating a hybrid vehicle 100. The hybrid vehicle 100 includes an Electric Control Unit (ECU) 10, a battery 12, a converter 14, an inverter 16, a motor generator (MG) 18, a motor generator (MG) 20, a power split mechanism 22, a reduction gear 24, drive wheels 26, and an engine (internal combustion engine) 30.

The engine 30 and the MG 20 function as a power source for driving the hybrid vehicle 100. The MG 20 is also used, for example, when starting the engine 30. The MG 18 functions as a power generator for charging the battery 12.

The power split mechanism 22 transmits the driving force of the engine 30 and the MG 20 to the reduction gear 24. The distribution between the power of the engine 30 and the power of the MG 20 is arbitrarily changed by the power split mechanism 22. The power split mechanism 22 is constituted by a planetary gear including, for example, a sun gear, a planetary carrier, and a ring gear.

When the MG 18 or the MG 20 functions as a motor, the DC power discharged from the battery 12 is boosted by the converter 14 and converted into AC power by the inverter 16. The AC power is supplied to the MG 18 or the MG 20.

During charging of the battery 12, the MG 18 or the MG 20 functions as a generator. AC power generated by the MG 18 or the MG 20 is converted into DC power by the invertor 16, stepped down by the converter 14, and then supplied to the battery 12.

Schematic Configuration of Engine

Figure 2:
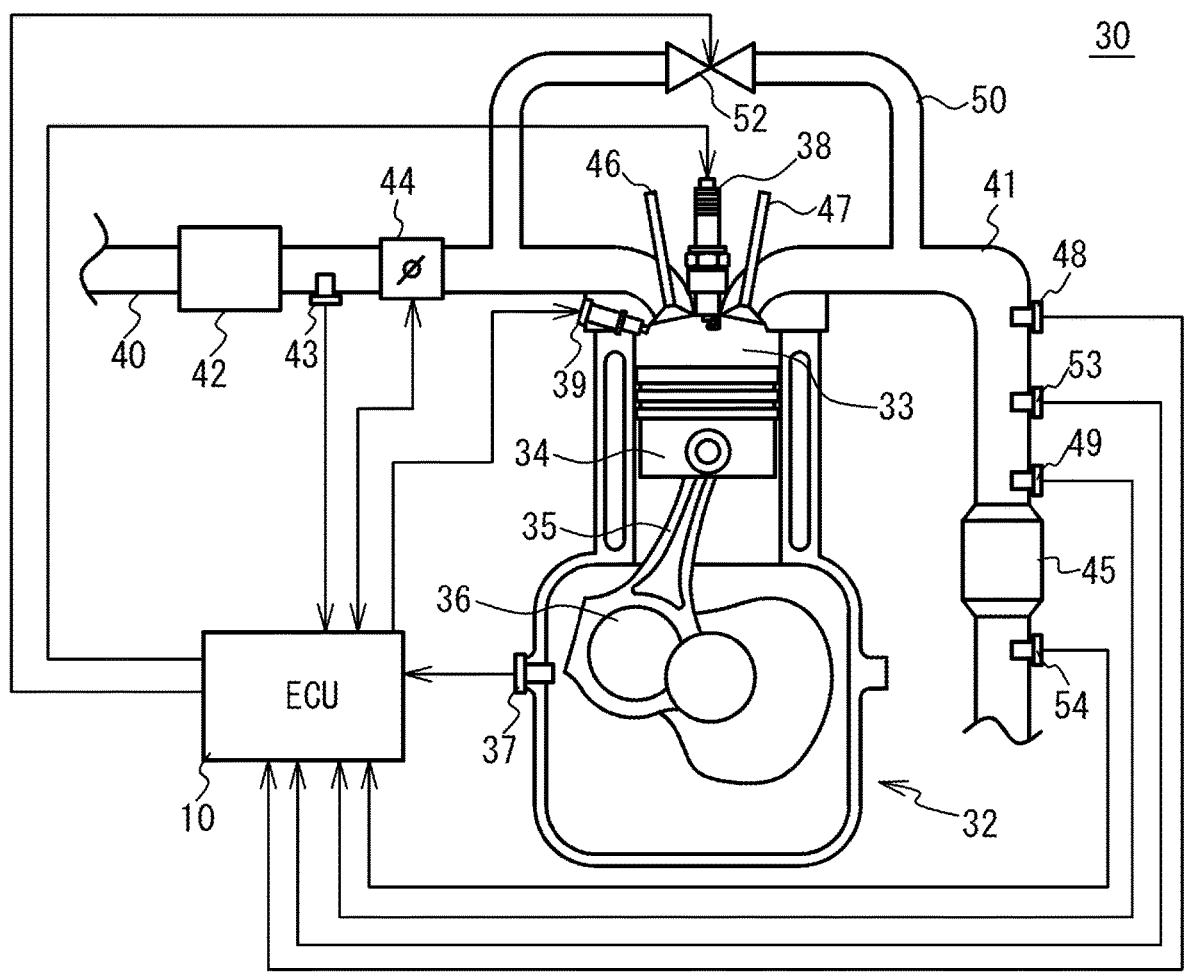
FIG. 2 is a schematic view illustrating an engine.

FIG. 2 is a schematic view illustrating the engine 30. As illustrated in FIG. 2, a combustion chamber 33 is formed inside an engine body 32 of the engine 30. A piston 34, a connecting rod 35, and a crankshaft 36 are disposed inside the engine body 32. The piston 34 is connected to the crankshaft 36 by the connecting rod 35. The engine body 32 is provided with a rotational speed sensor 37, an ignition plug 38, and a fuel injector 39. The rotational speed sensor 37 detects the rotational speed of the engine 30. The fuel injector 39 supplies fuel to the combustion chamber 33 (in-cylinder injection). The ignition plug 38 ignites the air-fuel mixture in the combustion chamber 33. The fuel injector 39 may be provided in the intake path 40 to perform port injection.

An intake path 40 and an exhaust path 41 are connected to the engine body 32. When a camshaft (not illustrated) rotates, an intake valve 46 and an exhaust valve 47 are opened and closed.

An air cleaner 42, an air flow meter 43, and a throttle valve 44 are provided in the intake path 40 from the upstream side to the downstream side. The air cleaner 42 removes dust and the like from air flowing in from the outside. The air flow meter 43 acquires an intake air amount. The throttle valve 44 is driven by, for example, an actuator (not illustrated) to adjust the intake air amount. When the opening degree of the throttle valve 44 increases, the intake air amount increases, and when the opening degree decreases, the intake air amount decreases.

When the intake valve 46 is opened, air is introduced from the intake path 40 into the combustion chamber 33. The fuel injected from the fuel injector 39 and air form an air-fuel mixture, which is compressed by the piston 34 and ignited by the ignition plug 38. The piston 34 reciprocates up and down in the combustion chamber 33 by the ignition, and the crankshaft 36 rotates. The exhaust gas after combustion is discharged from the exhaust path 41.

The exhaust path 41 is provided with an air-fuel ratio sensor 48, a pressure sensor 53, a filter 45, and a pressure sensor 54 in this order from the upstream side. The air-fuel ratio sensor 48 detects the air-fuel ratio of the gas flowing through the exhaust path 41. The filter 45 is, for example, a gasoline particulate filter (GPF). The filter 45 has a structure in which front end portions and rear end portions of adjacent cells among a large number of cells are alternately sealed in a porous ceramic structure. The exhaust gas flows into a cell having an open upstream end of the filter 45 and passes through a porous wall between the cell and an adjacent cell. At this time, exhaust particulate matter (PM) in the exhaust gas is trapped. A noble metal such as platinum may be supported on the filter 45. During the filter regeneration process, the noble metal promotes the oxidation reaction of the deposited PM.

The pressure sensor 53 detects a pressure on the upstream side of the filter 45 in the exhaust path 41. The pressure sensor 54 detects a pressure on the downstream side of the filter 45 in the exhaust path 41.

A temperature sensor 49 is provided near the filter 45 in the exhaust path 41. The temperature sensor 49 detects the temperature of the filter 45. The exhaust path 41 may be provided with a component for purifying exhaust gas, such as a three way catalyst.

One end of an EGR path 50 is connected to the exhaust path 41, and the other end is connected to the intake path 40. An EGR valve 52 is provided in the EGR path 50. A part of the exhaust gas (EGR gas) flows into the intake path 40 through the EGR path 50 and is introduced into the combustion chamber 33 again. When the opening degree of the EGR valve 52 becomes larger, the flow rate of the EGR gas increases, and when the opening degree becomes smaller, the flow rate of the EGR gas decreases. The EGR path 50 may be provided with, for example, an EGR cooler that cools the EGR gas.

The ECU 10 includes a central processing unit (CPU), a random access memory (RAM), a read only memory (ROM), a storage device, and the like, and executes various types of control by executing a program stored in the ROM or the storage device. The ECU 10 is an example of a control device for the hybrid vehicle 100.

The ECU 10 acquires a rotational speed detected by the rotational speed sensor 37, an intake air amount detected by the air flow meter 43, a temperature of the filter 45 detected by the temperature sensor 49, and an air/fuel ratio detected by the air/fuel ratio sensor 48.

The ECU 10 acquires pressures detected by the pressure sensors 53 and 54. The ECU 10 calculates the difference (differential pressure) between the pressures detected by the pressure sensors 53 and 54. The ECU 10 acquires an amount of PM deposited on the filter 45 based on the differential pressure. As the deposition amount of PM increases, the differential pressure increases.

The ECU 10 functions as a motor control unit that controls the MG 18 and the MG 20. The ECU 10 controls the engine 30, the MG 18 and the MG 20 to switch between electric driving (BEV driving) in which the engine 30 is not operated and hybrid driving (HEV driving) in which the engine 30 is operated. The ECU 10 controls charging and discharging of the battery 12 and the like. Instead of the ECU 10, for example, both an engine ECU that controls the engine 30 and a motor ECU that controls the MG 18, the MG 20, the battery 12, and the like may be provided. In this case, the engine ECU and the motor ECU are examples of the control device of the hybrid vehicle 100.

The ECU 10 adjusts the ignition timing of the ignition plug 38, the amount and the timing of fuel injection from the fuel injector 39, and the opening degrees of the throttle valve 44 and the EGR valve 52. The ECU 10 can stop the supply of fuel from the fuel injector 39 to the engine 30 (fuel cut). During the fuel cut, the ECU 10 causes the MG 20 to operate as a motor, for example, and causes the MG 20 to output power (motor assist).

The ECU 10 functions as a diagnostic unit that executes self-diagnosis (OBD process, that is, On Board Diagnosis) of components of the hybrid vehicle 100 during execution of the fuel cut. The components are, for example, the air-fuel ratio sensor 48 and the EGR valve 52. For example, the air-fuel ratio sensor 48 is diagnosed in the following manner. When the fuel cut is started, the exhaust gas from the engine body 32 becomes the atmospheric air. For this reason, it is monitored whether or not a value of the sensor signal of the air-fuel ratio sensor 48 after the elapse of a predetermined time from the start of the fuel cut control is a value of the air-fuel ratio corresponding to the atmosphere. Thus, the presence or absence of a failure of the air-fuel ratio sensor 48 is determined. The diagnosis of the EGR valve 52 is executed as follows. During the fuel cut control, the load fluctuation of the engine 30 is small. For this reason, when the EGR valve 52 is normal, the intake pressure fluctuates relatively greatly along with the opening and closing of the EGR valve 52. Therefore, during the fuel cut control, it is determined whether or not the difference between the intake pressure when the EGR valve 52 is forcibly fully opened and the intake pressure when the EGR valve 52 is forcibly fully closed exceeds a preset threshold value. In this way, it is determined whether or not there is a failure in the EGR valve 52.

The ECU 10 functions as an estimation unit that estimates the time (OBD time) required from the start to the completion of the OBD based on, for example, a flow rate of the air, a type of the component, and the like.

When PM is deposited on the filter 45, the ECU 10 executes a regeneration process of the filter 45. For example, the ECU 10 executes fuel cut. Due to the fuel cut, air containing a large amount of oxygen flows into the exhaust path 41. The PM deposited on the filter 45 is burned and removed.

During the filter regeneration process, the temperature of the filter 45 rises. The amount of heat generated by combustion of PM increases as the amount of oxygen supplied to the filter 45 increases, the deposition amount of PM increases, and the temperature of the filter 45 increases. The filter 45 might be damaged by heat. The ECU 10 functions as an upper limit setting unit that sets an upper limit of the time (F/C time) during which the fuel cut is executed. When the F/C time reaches the upper limit, the ECU 10 stops the fuel cut and restarts the fuel supply. By limiting the fuel cut time, damage to the filter 45 is suppressed.

When the F/C time reaches the upper limit, the fuel cut is forcibly terminated even if the self-diagnosis is not completed, and the self-diagnosis is also terminated without being completed. Although the motor assist is executed during the fuel cut, the fuel cut may be terminated while the self-diagnosis is not completed. The motor assist during the fuel cut is wasted. In order to secure an opportunity for self-diagnosis, fuel cut is executed again. When the motor assist is repeated in response to the fuel cut, power consumption increases. In the first embodiment, the number of times of motor assist is limited.

Figure 3:
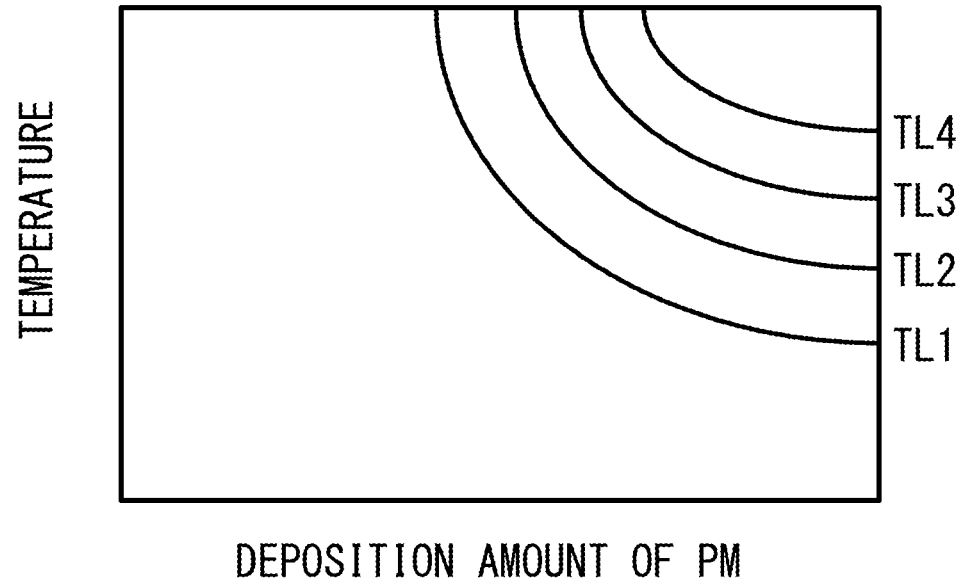
FIG. 3 is a view illustrating the upper limit of the fuel cut time.

FIG. 3 is a view illustrating the upper limit of the fuel cut time. A horizontal axis represents the amount of PM deposited on the filter 45. A vertical axis represents the temperature of the filter 45. The ECU 10 sets the upper limit TL of the fuel cut time (F/C time in the drawing) according to the deposition amount of PM and the temperature of the filter 45. Four upper limits TL1, TL2, TL3 and TL4 are illustrated in FIG. 3. The time is shorter as the deposition amount of PM is larger and the temperature is higher. Of the four upper limits, TL1 is the longest. TL2 is shorter than TL1. TL3 is shorter than TL2. TL4 is shorter than TL3.

Figure 4:
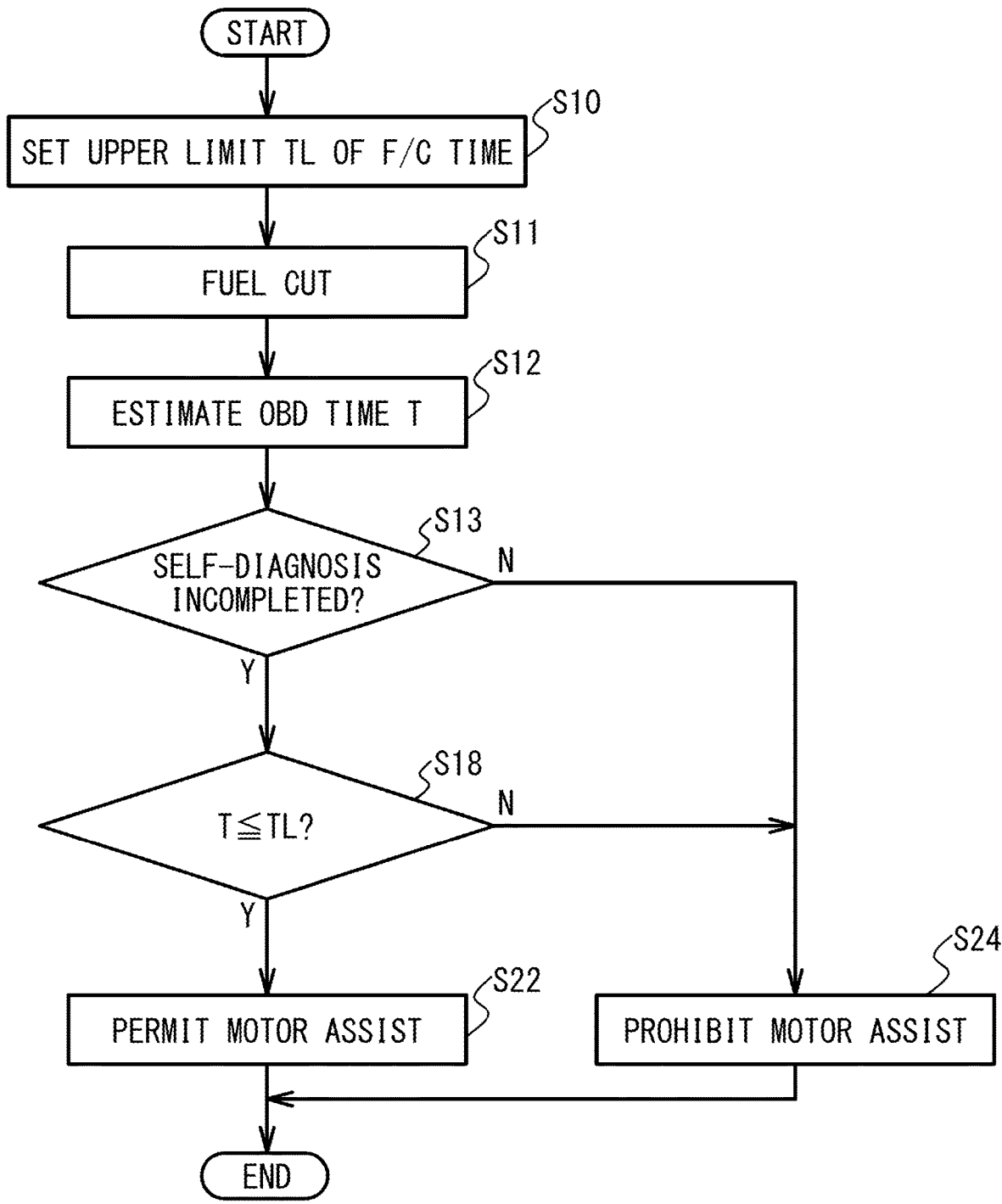
FIG. 4 is a flowchart illustrating processing according to the first embodiment.

FIG. 4 is a flowchart illustrating processing according to the first embodiment. The ECU 10 sets the upper limit TL of the F/C time (step S10) executes the fuel cut (step S11). The ECU 10 estimates the OBD time T (step S12). The ECU 10 determines whether or not the self-diagnosis is incomplete (step S13). In the case of a positive determination (Yes), the ECU 10 determines whether or not the estimated self-diagnosis time T is equal to or less than the upper limit TL (step S18). When the determination is affirmative, the ECU 10 permits the motor assist (step S22). The motor assist is executed during the fuel cut.

In the case of negative determination (No) in step S13 or S18, the ECU 10 prohibits the motor assist (step S24). The motor assist is not executed during the fuel cut. After step S22 or S24, the processes in FIG. 4 end.

According to the first embodiment, the ECU 10 diagnoses the components (the air fuel ratio sensor 48 and the like) during the fuel cut. The ECU 10 estimates the time T required for the self-diagnosis and sets an upper limit TL for the fuel cut time. When the estimated OBD time T is greater than the upper limit TL, the ECU 10 limits the motor assist. The limitation of the motor assist is to reduce the number of times of the motor assist, and the motor assist may be prohibited (step S24). This prohibits useless motor assist such that fuel cut is interrupted while OBD is not completed. When the estimated OBD time T is equal to or less than the upper limit TL, there is a high possibility that the OBD is completed during the fuel cut. The ECU 10 permits motor assist (step S22).

The useless motor assist is prohibited, and the motor assist is executed during the fuel cut in which it is estimated that the OBD is completed. By limiting the opportunity of the motor assist, it is possible to suppress an increase in power consumption. Since it is not needed to drive the MG for charging the battery 12, fuel efficiency is improved.

As illustrated in FIG. 3, the ECU 10 determines the upper limit TL based on, for example, the deposition amount of PM and the temperature of the filter 45. By setting the F/C time T to be equal to or less than the upper limit TL, damage to the filter 45 is suppressed.

Second Embodiment

Description of the same configuration as that of the first embodiment will be omitted. The configurations illustrated in FIGS. 1 and 2 are common to the second embodiment.

The ECU 10 functions as a first measurement unit that measures the number of times the diagnosis is not completed (the number of times the OBD failed). The ECU 10 functions as a second measurement unit that measures the time elapsed during the fuel cut.

Figure 5:
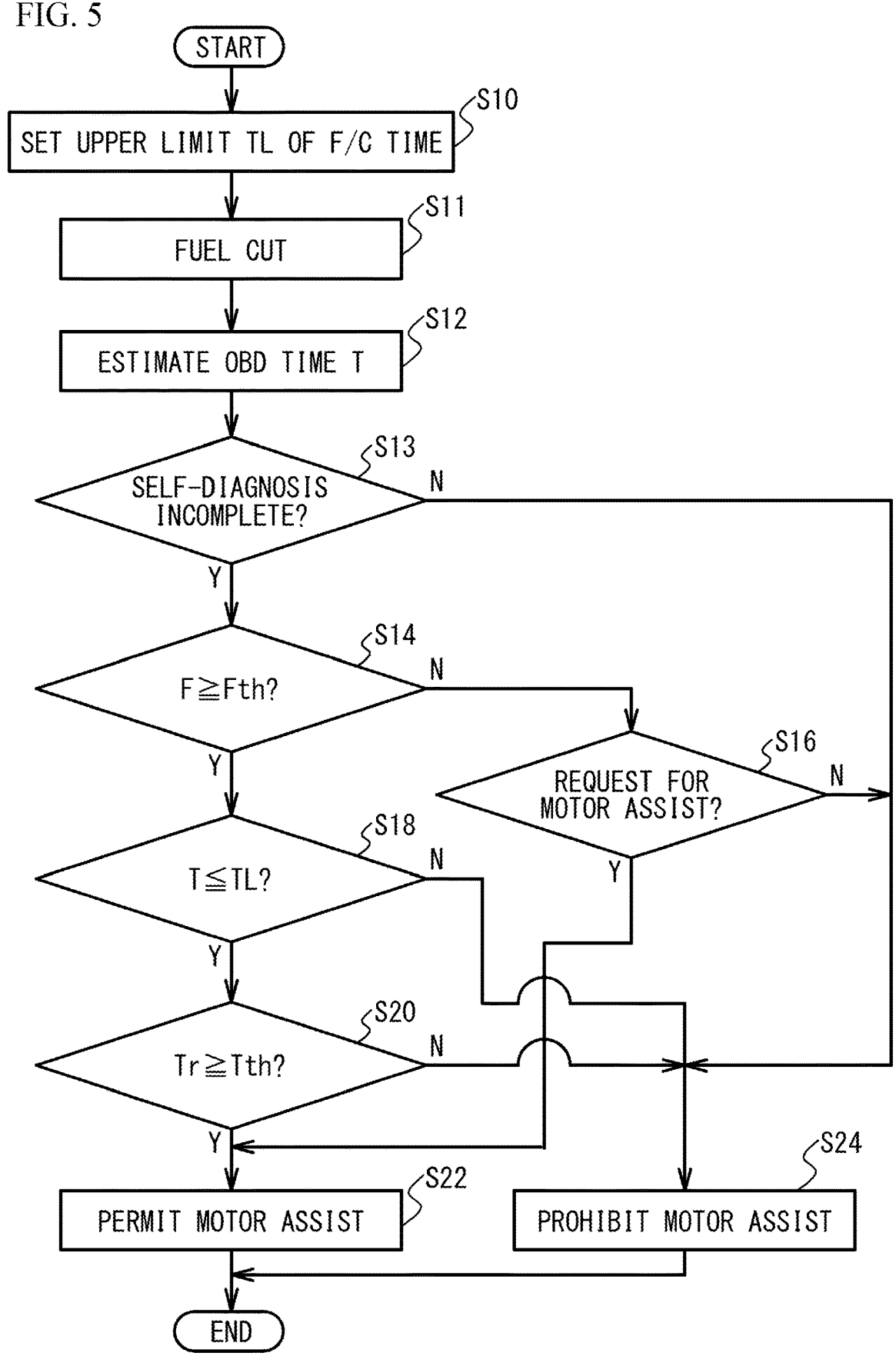
FIG. 5 is a flowchart illustrating processing according to the second embodiment.

FIG. 5 is a flowchart illustrating processing according to the second embodiment. The ECU 10 executes steps S10, S11, S12 and S13. The ECU 10 measures the number F of OBD failures and determines whether or not the number F is equal to or greater than a predetermined number Fth (step S14). When a negative determination is made, the ECU 10 determines whether or not there is a request for the motor assist (step S16). When an affirmative determination is made in step S16, the ECU 10 permits the motor assist (step S22). When a negative determination is made in step S16, the ECU 10 prohibits the motor assist (step S24).

When an affirmative determination is made in step S14, the ECU 10 determines whether or not the estimated time T of the OBD is equal to or less than the upper limit TL (step S18). When the determination is negative, the ECU 10 prohibits the motor assist (step S24).

When an affirmative determination is made in step S18, the ECU 10 measures the time Tr actually elapsed during the fuel cut, and determines whether or not the time Tr is equal to or greater than the predetermined time Tth (step S20). When the determination is affirmative, the ECU 10 permits the motor assist (step S22). When the determination is negative, the ECU 10 prohibits the motor assist (step S24). After step S22 or S24, the processes in FIG. 5 end.

Figure 6:
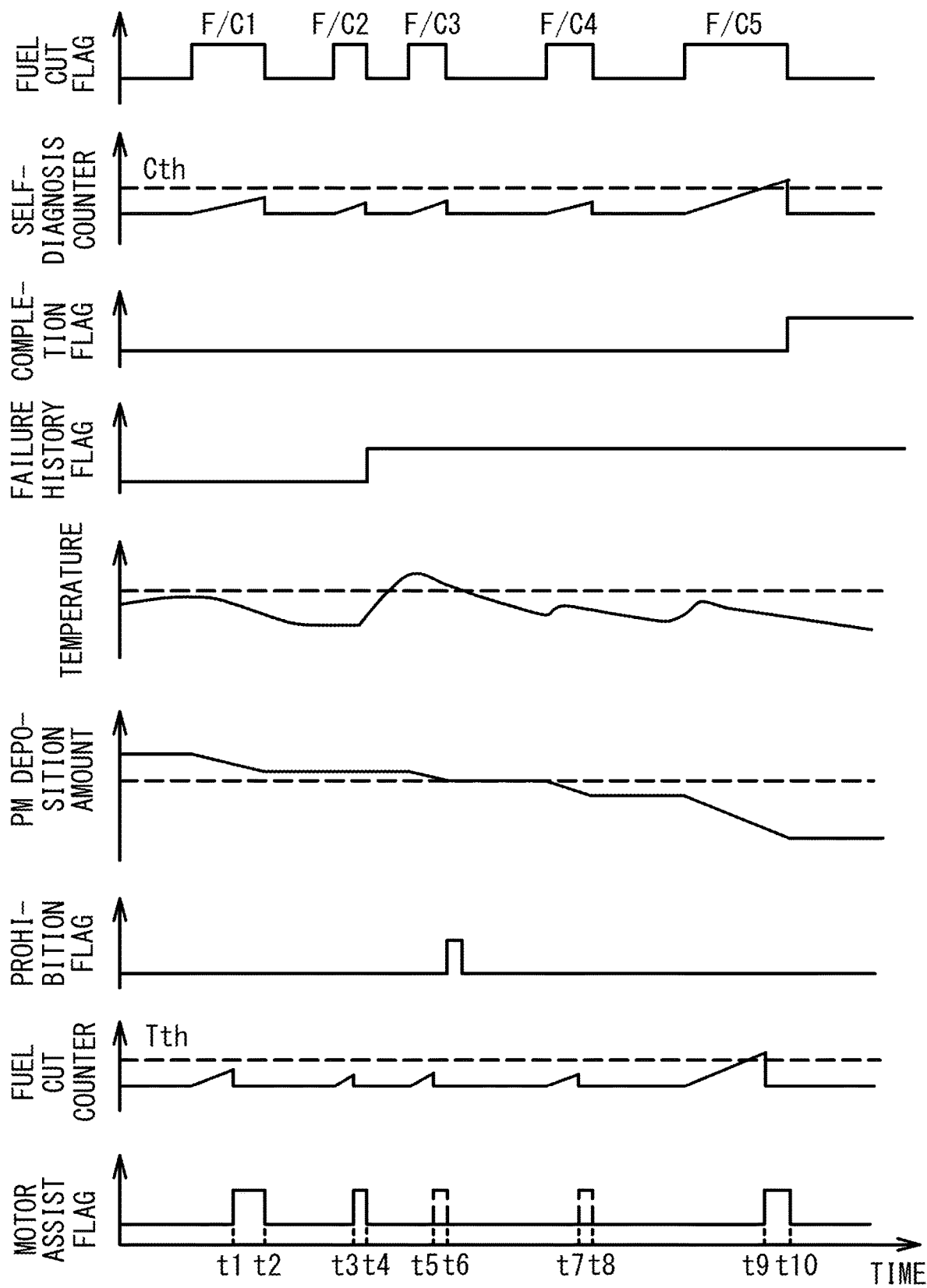
FIG. 6 is a view illustrating a time chart.

FIG. 6 is a view illustrating a time chart. A fuel cut flag, a self-diagnosis counter, a completion flag of self-diagnosis, a failure history flag of self-diagnosis, a temperature of the filter 45, a deposition amount of PM, a prohibition flag of fuel cut, a fuel cut counter, and a motor assist flag are illustrated in order from the top. In the example of FIG. 6, fuel cut is executed five times. The plurality of fuel cuts are assumed to be F/C1, F/C2, F/C3, F/C4, and F/C5 from the first in the order. The fuel cut counter corresponds to the time Tr elapsed during the fuel cut.

The self-diagnosis is executed during the fuel cut. The self-diagnosis counter corresponds to the time of the self-diagnosis. When the self-diagnosis counter reaches Cth, the self-diagnosis is completed. When the self-diagnosis is completed, a self-diagnosis completion flag is turned on. When the self-diagnosis is suspended, the completion flag is kept off. When the number F of failures in the self-diagnosis becomes equal to or greater than the predetermined number Fth, the failure history flag is turned on (step S14 in FIG. 5). In the example of FIG. 6, Fth is two times.

The prohibition flag is a prohibition flag for fuel cut accompanied by the motor assist. When the prohibition flag is off, the fuel cut accompanied by the motor assist is permitted. When the prohibition flag is on, the fuel cut accompanied by the motor assist is prohibited, and the motor assist is not executed. When the motor assist flag is off, the motor assist is prohibited. When the motor assist flag is on, the motor assist is permitted.

During the period from the time t1 to the time t2 during the execution of fuel cut 1 and during the period from the time t3 to the time t4 of fuel cut 2, the motor assist flag is on and the motor assist is executed. The self-diagnosis is executed during the fuel cut 1 and the fuel cut 2. The self-diagnosis counter is shorter than Cth. The self-diagnosis is not completed. Since the self-diagnosis failed twice, the failure history flag is turned on (step S14 in FIG. 5).

During the execution of fuel cut 3, the self-diagnosis is executed but is not completed (the completion flag is off). During the time period from t5 to t6 during the execution of the fuel cut 3, when the motor assist flag is turned on as indicated by a broken line, the motor assist flag is set. However, since the self-diagnosis is not completed, the motor assist is wasted.

According to the second embodiment, when the fuel cut 3 is executed, the temperature of the filter 45 is higher than the temperature indicated by the broken line. The PM deposition amount is larger than the amount indicated by the broken line. The ECU 10 sets the upper limit TL of the F/C time according to the temperature and the deposition amount (step S10). When the estimated time T is greater than the upper limit TL, the ECU 10 turns on the prohibition flag to prohibit the fuel cut with the motor assist (steps S18 and S24 in FIG. 5). As illustrated in FIG. 6, the motor assist flag is turned off and motor assist is not executed.

During the execution of fuel cut 4, the self-diagnosis is executed but is not completed (the completion flag is off). During the time period from t7 to t8 during the execution of the fuel cut 4, when the motor assist flag is turned on as indicated by a broken line, the motor assist flag is set. However, since the self-diagnosis is not completed, the motor assist is wasted. According to the second embodiment, the motor assist is prohibited while the fuel cut counter (time Tr) is less than Tth (steps S20 and S24 in FIG. 5). The fuel cut 4 is finished before the fuel cut counter reaches Tth. The motor assist is not executed during the fuel cut 4.

During the execution of fuel cut 5, the fuel cut counter reaches Tth. Thereafter, the motor assist flag is turned on from time t9 to time t10. The motor assist is permitted (step S22 in FIG. 5). At time t10, the self-diagnostic counter becomes greater than or equal to Cth. The self-diagnosis is complete.

According to the second embodiment, the self-diagnosis and the motor assist are executed in the fuel cut 1 and the fuel cut 2, but the self-diagnosis fails. It is presumed that the self-diagnosis of a component (for example, the air-fuel ratio sensor 48) takes a long time. When the number of times of failure of the self-diagnosis becomes, for example, two, the ECU 10 turns on the failure history flag (affirmative determination in step S14 of FIG. 5). When the estimated OBD time T is greater than the upper limit TL, the ECU 10 prohibits the motor assist (steps S18 and S24 in FIG. 5, the fuel cut 3 in FIG. 6). By reducing the number of times of motor assist, it is possible to suppress an increase in power consumption. Since it is not needed to drive the MG for charging the battery 12, fuel efficiency is improved.

When the failure history flag is on and the fuel cut time Tr is less than Tth, the motor assist is prohibited (steps S20 and S24 in FIG. 5, the fuel cut 4 in FIG. 6). When the self-diagnosis fails, the motor assist is not executed. An increase in power consumption is suppressed.

Even if the failure history flag is on, when the fuel cut time Tr is equal to or greater than Tth, the motor assist is permitted (steps S20 and S22 in FIG. 5, the fuel cut 5 in FIG. 6). The self-diagnosis is complete and the motor assist is executed. The opportunity of the motor assist is limited when self-diagnosis is successful. It is possible to suppress useless motor assist and suppress an increase in power consumption.

The threshold value Fth for the number of times of failure of self-diagnosis may be, for example, one time, two times, or three times or more. The threshold value Tth for the fuel cut counter may be, for example, 2 seconds, 3 seconds, 4 seconds, 5 seconds, or the like.

Although some embodiments of the present disclosure have been described in detail, the present disclosure is not limited to the specific embodiments but may be varied or changed within the scope of the present disclosure as claimed.

What is claimed is:

1. A control device for a hybrid vehicle including a motor and an internal combustion engine as power sources, the control device comprising:
    a diagnosis unit configured to diagnose a component of the hybrid vehicle during fuel cut of the internal combustion engine;
    an estimation unit configured to estimate a time required for diagnosis by the diagnosis unit;
    an upper limit setting unit configured to set an upper limit of a time during which the fuel cut is executed; and
    a motor control unit configured to control the motor,
    wherein
    when the time estimated by the estimation unit is equal to or less than the upper limit, the motor control unit is configured to permit driving assist by the motor during the fuel cut, and
    when the time estimated by the estimation unit is greater than the upper limit, the motor control unit is configured to limit the driving assist by the motor during the fuel cut.

2. The control device for the hybrid vehicle according to claim 1, wherein
    a filter is provided in an exhaust path of the internal combustion engine, and
    the upper limit setting unit is configured to set the upper limit based on a deposition amount of particulate matters on the filter and a temperature of the filter.

3. The control device for the hybrid vehicle according to claim 1, further comprising a first measurement unit configured to measure a number of times that the diagnosis by the diagnosis unit is not completed,
    wherein
    when the number of times that the diagnosis by the diagnosis unit is not completed is equal to or greater than a predetermined number of times, and when the time estimated by the estimation unit is greater than the upper limit, the motor control unit is configured to limit the driving assist by the motor during the fuel cut.

4. The control device for the hybrid vehicle according to claim 3, further comprising a second measurement unit configured to measure a time elapsed during the fuel cut,
    wherein
    when the number of times that the diagnosis by the diagnosis unit is not completed is equal to or greater than the predetermined number of times, and when the time measured by the second measurement unit is less than a predetermined time, the motor control unit is configured to limit the driving assist by the motor, and when the number of times that the diagnosis by the diagnosis unit is not completed is equal to or greater than the predetermined number of times, and when the time measured by the second measurement unit is equal to or greater than the predetermined time, the motor control unit is configured to permit the driving assist by the motor during the fuel cut.

\* \* \* \* \*